No. 627,845. Patented June 27, 1899.
G. K. DAVIS.
PLATFORM TRUCK.
(Application filed Nov. 14, 1898.)

(No Model.) 2 Sheets—Sheet 1.

WITNESSES:
Edw. Thorpe
J. Redecker

INVENTOR
G. K. Davis
BY
Munn
ATTORNEYS.

No. 627,845. Patented June 27, 1899.
G. K. DAVIS.
PLATFORM TRUCK.
(Application filed Nov. 14, 1898.)
(No Model.) 2 Sheets—Sheet 2.
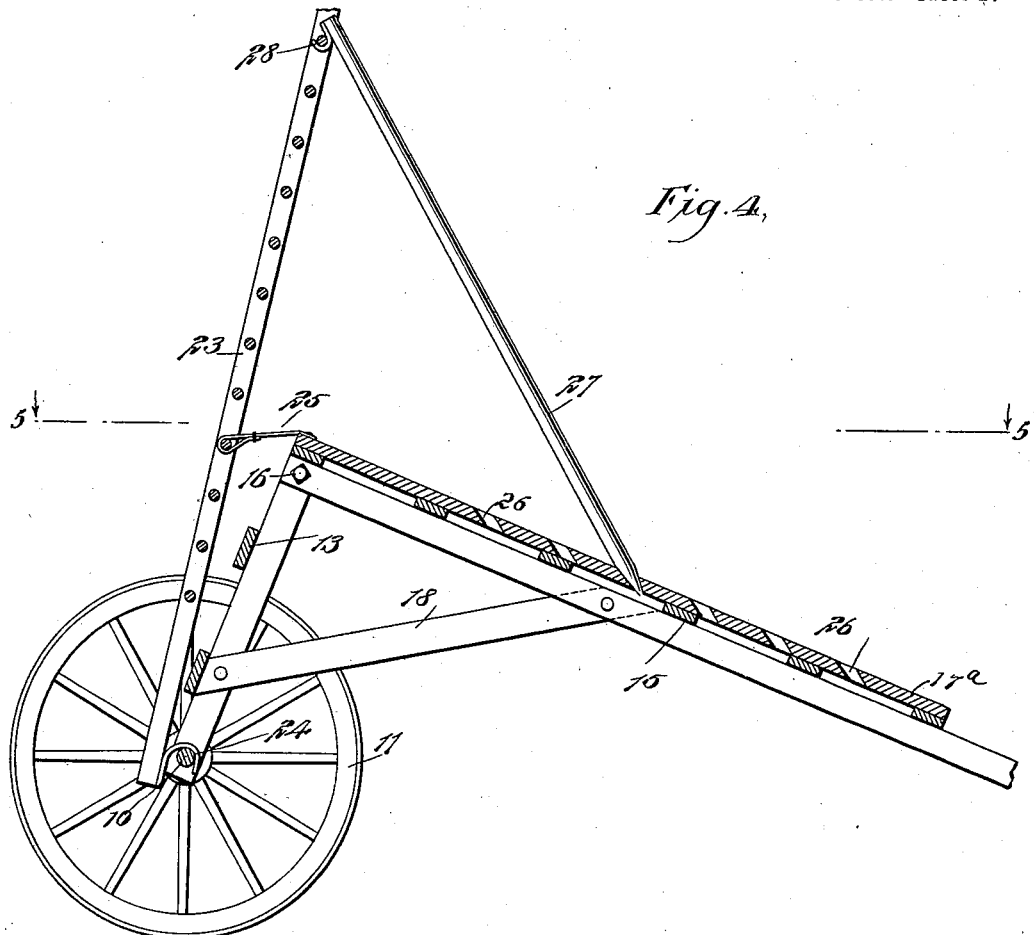
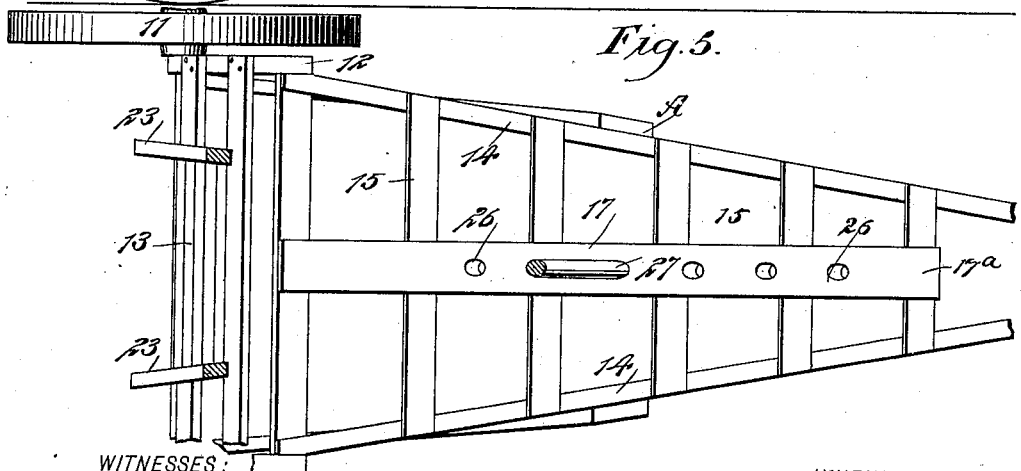
WITNESSES:
Edward Thorpe.
INVENTOR
G. K. Davis
BY
ATTORNEYS.

UNITED STATES PATENT OFFICE.

GEORGE K. DAVIS, OF LEWISTON, MAINE.

PLATFORM-TRUCK.

SPECIFICATION forming part of Letters Patent No. 627,845, dated June 27, 1899.

Application filed November 14, 1898. Serial No. 696,422. (No model.)

*To all whom it may concern:*

Be it known that I, GEORGE K. DAVIS, of Lewiston, in the county of Androscoggin and State of Maine, have invented a new and Improved Platform-Truck, of which the following is a full, clear, and exact description.

The object of my invention is to provide a platform-truck especially adapted for use in an orchard and which may also be used to advantage in the building trades.

A further object of the invention is to so construct the truck that its platform may be raised or lowered and held firmly in either position and whereby the truck may be conveniently moved around a tree or like object to which it may be attached or be used in the same manner as an ordinary truck.

A further object of the invention is to provide a means whereby the truck may be held stationary even when it is not attached to an object.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
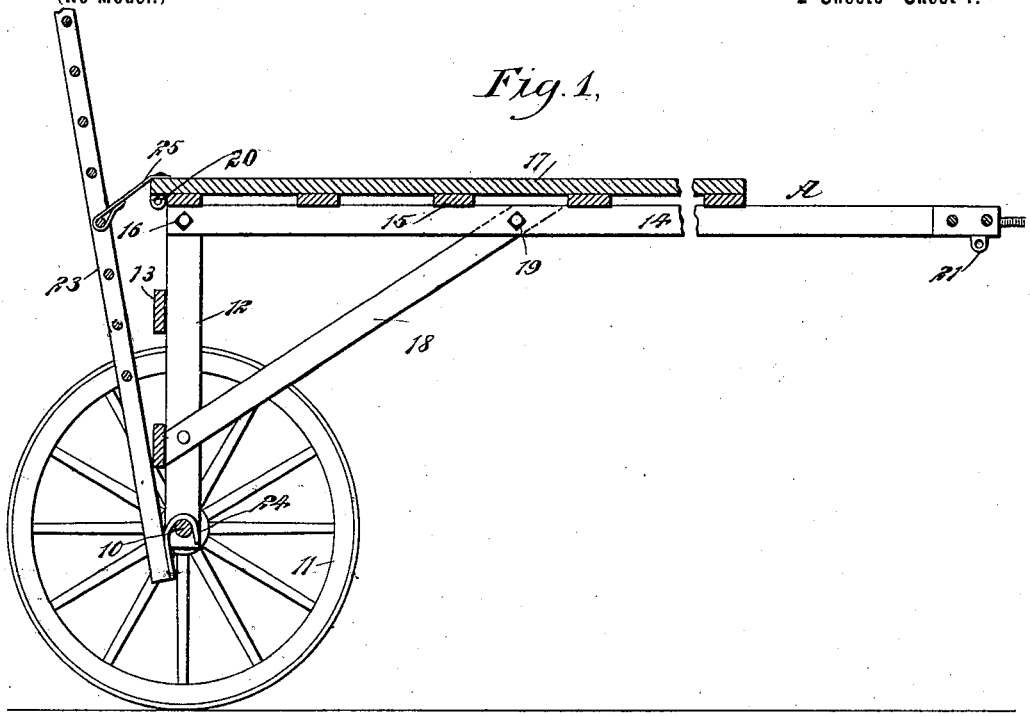
Figure 2:
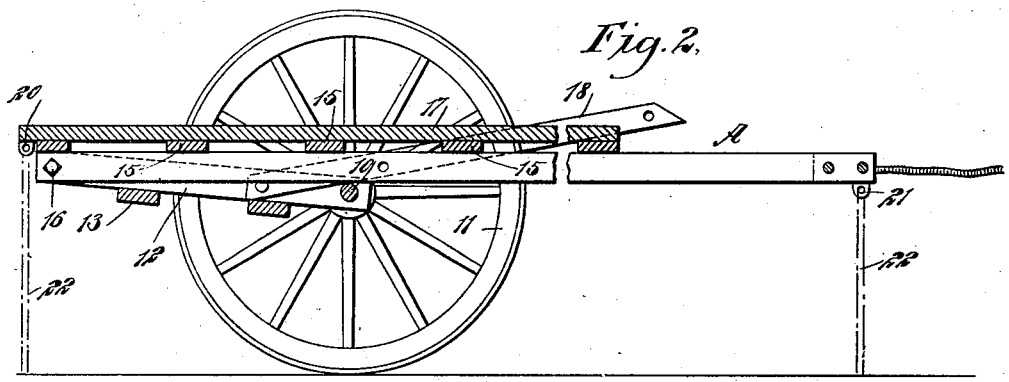
Figure 3:
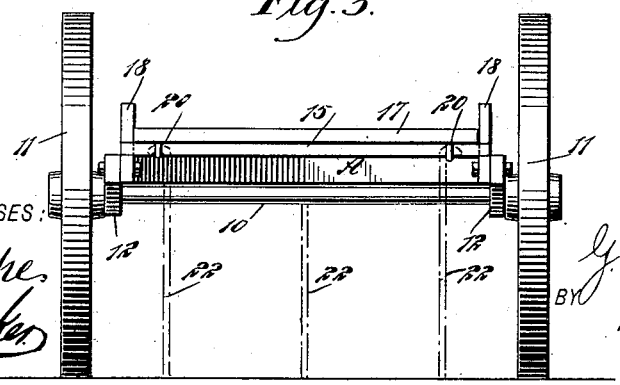

Figure 1 is a longitudinal vertical section through the truck, the platform being raised. Fig. 2 is a longitudinal vertical section through the truck, the platform being lowered. Fig. 3 is a rear view of the truck, the platform being in its lower position. Fig. 4 is a longitudinal section of the truck, illustrating it in a position that admits of the adjustment of the latter; and Fig. 5 is a longitudinal section taken practically on the line 5 5 of Fig. 4, the truck being shown in broken plan view.

In the construction of the truck a single axle 10 is employed, which axle is provided at each end with a supporting-wheel 11 of suitable size, the wheels turning loosely on the axle. An arm 12 is pivoted to the axle, adjacent to the inner face of the hub of each wheel, and the arms 12 are connected by cross-bars 13, so that said arms will move together, and these arms may be regarded as links.

In connection with the arms 12 a frame A is employed, said frame being preferably an A-frame, its wider end being the rear end. The side bars 14 of the A-frame are connected by cross-bars 15, and the rear ends of the said beams 14 of the A-frame are pivotally attached to the outer ends of the arms 12, as shown in Figs. 1 and 2, through the medium of pivot-bolts 16 or their equivalents. The A-frame is adapted to support a platform 17, and said platform is attached to the frame in any approved manner. Side braces 18 are pivoted to the inner faces of the arms 12 at a point near the connection of said arms with the axle 10, and the braces 18 are adapted to support the frame A when in an elevated position, as shown in Fig. 1, and this is accomplished by passing bolts 19 through the upper ends of the braces and through suitable openings in the side beams of the said frame.

When the platform is in its lower position, the frame carrying the platform rests upon the axle 10 and is supported thereby, as shown in Fig. 2. At this time the braces are not needed and are made to extend forwardly, as illustrated also in Fig. 2, resting upon the axle. When the platform and frame are in their upper positions and it is desired to lower them, the braces 18 are disconnected from the frame, and the frame is permitted to drop down to the axle, the arms 12 folding downward and rearward, the rear end of the frame being between said arms.

When the device is used in an orchard, the contracted or forward end of the frame A is connected to the trunk of the tree or to a main branch by means of a hook or strap, and the platform may be either lowered or raised, as may be required, and if the platform is not high enough when in its elevated position a box may be safely placed upon the platform to increase the height of the device from the ground.

It is evident that the truck may be shifted around the trunk of a tree by simply raising up the rear end of the truck and carrying it to the desired point. It is also evident that when the platform and frame are in their lower positions the truck may be used for the same purpose as an ordinary truck.

It may sometimes be desirable that the truck should stand alone, and to that end eyes 20 are attached to the rear portion of the platform, one near each side, and a third eye is attached to the forward end of the A-frame. These eyes are adapted to receive the hooked upper ends of supports 22, which supports are in the nature of rods and are adapted to rest upon the ground at their lower ends.

In order that the outside extremities of the limbs of trees and the higher portions of a tree may be reached readily, I have provided a ladder 23, which ladder is provided with hooks or clamps 24, attached to its lower end, the clamps or hooks 24 being so shaped as to embrace the axle. The ladder is preferably of A form, and its base is of such width that it may be readily placed between the arms or links 12, so as not to interfere with the movement of said arms or links. The ladder when not in use is attached to the platform 17 by means of straps 25 or the equivalents thereof, and these straps are passed around a convenient rung of the ladder; but the ladder when so attached to the platform may be used, if occasion should require. While the platform of the truck is in a horizontal position the ladder when attached to the truck will occupy an upwardly-inclined position at the rear of the truck, and it is evident that the ladder while carried by the truck will not in the slightest degree interfere with the elevation and depression of the platform, and it is further evident that when the ladder is not needed it may be readily disconnected from the truck.

When a ladder is attached to the truck, the platform may consist of a single longitudinal strip 17ª, as shown in Figs. 4 and 5, the said strip or the ordinary platform 17 when employed being provided with a series of longitudinally-located apertures 26, and the said apertures are preferably given an inclination upward and in direction of the rear of the truck. Such inclination is given to the apertures 26 in order that they may receive the pointed lower end of a brace 27, the said brace being in the nature of a pole, provided at its upper end with a hook 28. The hook 28 is adapted to engage with any convenient rung of the ladder, the straps 25 having been disengaged from the ladder. It is obvious that through the medium of the brace 27 the ladder may be held at any desired inclination, the upper end of the brace engaging with a rung of a ladder, the lower end of the brace entering an aperture 26 in the platform. When the brace 27 is employed, the forward end of the body of the truck is preferably permitted to rest upon the ground, as shown in Figs. 4 and 5. It is also obvious that the truck may be used to advantage in the building trades and that it is exceedingly simple. Hence its manipulation may be readily understood and its adjustments may be quickly and easily accomplished.

Having thus described my invention, I claim as new and desire to secure by Letters Patent—

1. In a platform-truck, the combination of an axle, arms mounted loosely on the axle, a frame pivoted to the arms, removable braces extending between the frame and arms, a platform mounted on the frame, a ladder, hooks at the lower portion of the ladder for engaging the axle, and a brace having a hook at its upper end to engage the ladder, the lower end of the brace being adapted to engage the platform, whereby to support the ladder.

2. In a platform-truck, the combination of a wheeled frame, a platform secured thereto, a ladder, hooks at the lower portion of the ladder to engage a portion of the truck, whereby to support the truck, and a brace, the upper end of which is adapted to engage the ladder and the lower end of which is capable of engagement with the platform, whereby to support the ladder.

GEORGE K. DAVIS.

Witnesses:
WALLACE H. WHITE,
HERBERT S. WILLEY.